(12) United States Patent
Burge

(10) Patent No.: US 6,277,421 B1
(45) Date of Patent: Aug. 21, 2001

(54) FOOD PRODUCT COMPRISING MASA FLAVORED FLOUR

(75) Inventor: Roger M. Burge, Danville, IL (US)

(73) Assignee: Bunge Lauhoff Grain Company, Danville, IL (US)

( * ) Notice: Subject to any disclaimer, the term of this patent is extended or adjusted under 35 U.S.C. 154(b) by 898 days.

(21) Appl. No.: 08/668,971

(22) Filed: Jun. 24, 1996

Related U.S. Application Data

(63) Continuation of application No. 08/444,404, filed on May 19, 1995, now abandoned.

(51) Int. Cl.$^7$ .................................................. A21D 13/00
(52) U.S. Cl. ........................... 426/94; 426/439; 426/496; 426/549; 426/615; 426/808
(58) Field of Search ................................. 426/549, 554, 426/622, 626, 462, 439, 94, 496, 615, 808

(56) References Cited

U.S. PATENT DOCUMENTS

| | | |
|---|---|---|
| 826,983 | 7/1906 | Wreford et al. . |
| 1,221,636 | 4/1917 | Von Hagen . |
| 1,262,144 | 4/1918 | Villegas . |
| 2,584,893 | 2/1952 | Lloyd et al. . |
| 2,704,257 | 3/1955 | Sollano et al. . |
| 3,117,868 * | 1/1964 | Madrazo et al. ........................ 99/80 |
| 3,369,908 | 2/1968 | Gonzalez et al. . |
| 3,859,452 | 1/1975 | Mendoza . |
| 4,250,802 | 2/1981 | Rubio . |
| 4,463,022 | 7/1984 | Sterner et al. . |
| 4,594,260 | 6/1986 | Vaqueiro et al. . |
| 4,806,377 | 2/1989 | Ellis et al. . |
| 4,879,126 * | 11/1989 | Willard et al. ........................ 426/272 |
| 5,176,931 | 1/1993 | Herbster . |
| 5,332,594 * | 7/1994 | Heller .................................. 426/549 |

* cited by examiner

*Primary Examiner*—Lien Tran
(74) *Attorney, Agent, or Firm*—Cook, Alex, McFarron, Manzo, Cummings & Mehler, Ltd.

(57) ABSTRACT

A nixtamalized farinaceous component having pronounced masa flavor alone or together with other food components wherein the nixtamalized farinaceous component is produced by heating a superficially dry composition comprising farinaceous component, alkaline compound in a concentration of at least 0.2 parts by weight per 100 parts by weight farinaceous component (d.s.b.) and water in a closed system to develop a pronounced masa flavor without pasting the starch component of the farinaceous component while maintaining the water content of the composition in the closed system at 2% to 20% by weight of the composition.

10 Claims, No Drawings

FOOD PRODUCT COMPRISING MASA FLAVORED FLOUR

This is a continuation of application Ser. No. 08/444,404 filed May 19, 1995 now abandoned.

BACKGROUND AND DESCRIPTION OF THE INVENTION

This invention relates to a nixtamalized farinaceous component having pronounced masa flavor. More particularly, this invention relates to a food product comprising a major portion of a non-nixtamalized component substantially free of masa flavor and minor portion of a nixtamalized corn flour having pronounced masa flavor wherein the nixtamalized corn flour component is produced by heating a superficially dry composition comprising corn flour, alkaline compound and water in a closed system to develop a pronounced masa flavor without pasting the starch component of the corn flour and preferably cooling the composition to ambient conditions while maintaining the water content of the composition in the closed system at 2% to 20% by weight of the composition.

Flours, such as wheat and rye, are used extensively to produce breads (wheat and rye), pastas (wheat), etc. However, these products without other additives are relatively bland.

Whole or ground corn are commonly nixtamalized (treated with alkali) to provide a so-called masa flavor to food products such as corn tortillas and corn chips. While tortillas and corn chips have a distinctively pleasant taste, the whole or ground corn can not be baked into fluffy breads or processed into pasta and noodles, such as those produced from wheat flour.

Numerous references describe the nixtamalization of corn flours. However, most of these produce a product containing the corn starch in a partially gelatinized form which is necessary for preparing the partially gelatinized dough sheets used in forming corn tortillas, corn chips, etc. The nixtamalized corn flour containing starch in a partially gelatinized form tends to deteriorate unless refrigerated and generally has to be dried before it can be blended with other superficially dry farinaceous flours.

Mendoza U.S. Pat. No. 3,859,452 describes a method of producing a nixtamalized corn flour containing substantially unpasted starch in a continuous process having a residence time of about 5 to 10 minutes at about 80° C. to 120° C. Unfortunately, the product is under nixtamalized (low in masa flavor) due to the relatively low levels of lime (up to 0.04% by weight) and the short residence time.

The general object of this invention is to provide food products containing a major portion of a non-nixtamalized product with a masa flavor. A more specific object of this invention is to provide a masa flavor to wheat food products. Other objects appear hereinafter.

The general object of this invention can be attained with compositions comprising a major portion of an under or non-nixtamalized food product, preferably a farinaceous product, and a minor portion of nixtamalized corn flour component having a pronounced masa flavor wherein the nixtamalized corn flour component is produced by heating a superficially dry composition comprising corn flour, alkaline compound and water in a closed system to develop a pronounced masa flavor without pasting the starch component of the corn flour and preferably cooling the composition to ambient conditions, while maintaining the water content of the composition in the closed system at 2% to 20% by weight of the composition and the alkaline compound is an alkali or alkaline earth metal compound in a concentration of at least 0.2 parts by weight per 100 parts by weight corn flour on a dry solids basis (d.s.b.).

Briefly, the nixtamalized corn flour having pronounced masa flavor can be formed by heating together in a closed system corn flour, water and alkaline compound continuously or batchwise, preferably cooling the composition to ambient conditions, without pasting the starch component of the corn flour while maintaining the water content of the composition in the closed system at 2% to 20% by weight.

For purposes of this invention it is essential that the alkaline compound be present in a concentration of at least 0.2% by weight based on the weight of the corn flour (d.s.b.) to attain the necessary masa concentrate flavor, i.e. at least 5 times the maximum alkaline compound concentration disclosed in Mendoza U.S. Pat. No. 3,859,452.

Corn flour suitable for nixtamalization can be whole ground corn containing the germ and bran portion of the corn kernel, dry milled corn flour containing about 70% to 90% by weight d.s.b. (dry solid basis) granular corn starch which is substantially free of the germ and bran of the corn kernel, etc. Dry milled degermed corn flour is preferred since farinaceous products therefrom do not contain dark specs from the bran and germ.

For purposes of this invention, it is essential that the corn flour composition undergoing nixtamalization contain from about 0.3 to 6 parts by weight fat per 100 parts by weight corn flour (d.s.b.), preferably 1.0 to 2.8 parts by weight per 100 parts by weight corn flour (d.s.b.). In general, the higher the fat content the more pronounced the masa flavor of the nixtamalized flour.

Suitable alkaline materials useful in the nixtamalization include alkali metal hydroxides and carbonates and alkaline earth metal oxides and hydroxides such as calcium hydroxide, calcium oxide, sodium hydroxide, sodium bicarbonate, potassium hydroxide, etc. in a concentration of about 0.2 to 2 parts by weight per 100 parts by weight corn flour (d.s.b.) preferably about 0.5 to 1.5 parts by weight per 100 parts by weight corn flour (d.s.b.).

The water content (total concentration of moisture in the corn flour and added water) of the nixtamalization blend (corn flour, alkaline compound and water) must be maintained in the range of about 2% to 20% by weight preferably 10% to 14% by weight, in order to provide enough water to activate the caustic without pasting the starch during nixtamalization. Loss of the water results in reduced or limited nixtamalization and masa flavor formation.

As indicated above, the corn flour, alkaline compound and water are heated in a closed system. In a batch system the corn flour is preferably maintained at about 150° C. to 250° F., preferably 180° C. to 210° F. for a time sufficient to provide a pronounced masa flavor to the corn flour (e.g. 30 minutes to 2 hours). In general, the higher the temperature, the faster the corn flour takes on the desired masa flavor and the more likely the granular starch is to paste.

After the masa flavored corn flour is cooled to room temperature, it can be shipped to the ultimate user for blending with under or non-nixtamalized product or blended prior to shipment. In either case a food product containing a major portion of an under or non-nixtamalized food product, preferably a farinaceous component, and a minor portion of a nixtamaliz;ed farinaceous component having a pronounced masa flavor can be formed.

Suitable under or non-nixtamalized food products useful in this invention include farinaceous flours such as wheat flour, rye flour, etc.

The weight ratio of nixtamalized farinaceous component having a pronounced masa flavor to under or non-nixtamalized component can range from about 1:1 to 1:20 parts by weight (d.s.b.), preferably 1:2 to 1:10 parts by weight.

While this invention is primarily directed to food products comprising a major portion of an under or non-nixtamalized farinaceous component and a minor portion of a nixtamalized farinaceous component having pronounced masa flavor, the nixtamalized farinaceous material can be advantageously added to other food products, such as salsa sauces, meat products, vegetables, etc.

EXAMPLE I

The example illustrates the nixtamalization of dry milled degermed corn flour to produce a corn flour having a pronounced masa flavor. A blend of 500 pounds degermed dry milled corn flour containing 1.5% by weight corn oil and 12.0% by weight water and 5 pounds calcium oxide were heated with agitation to 190° F. in a Littleford Day Model FKM 600 Plow Blender equipped with a steam jacket and a high speed chopper. After agitating at 190° F. for one hour, nixtamalized flour was discharged and cooled to <100° F. by spreading on supports and turning frequently or tumble dried before sifting through USS #30 sieve.

EXAMPLE II

This example illustrates the preparation of pasta from a blend of durum semolina and nixtamalized corn flour having a pronounced masa flavor.

A blend of 45.6 parts by weight durum semolina (containing about 10 to 15% by weight water), 30 parts by weight masa flavored corn flour produced in the manner described in Example 1 and 24 parts by weight added water were cold extruded on a CLEXTRAL INC BC 45 twin screw extruder with two 0.55"×1/32" "mafalda" dies. The finished pasta was cooked in boiling water and had the desired pasta texture but the masa level was judged to be too pronounced.

Some months later a sample of this pasta was taken from freezer storage and fried to evaluate it as a fried pasta snack. Masa flavor held up in the fryer (still judged to be too pronounced) and the texture was good.

The masa flavor of these products can be adjusted by reducing the concentration of masa flavored corn flour as shown in Example III.

EXAMPLE III

A blend of 51 parts by weight durum semolina (containing about 10 to 15% by weight water) 13 parts by weight masa corn flour (as is) produced in the manner described in Example I and 36 parts by weight water were cold extruded into pasta in the manner described in Example III. The cooked finished pasta had the desired pasta texture and excellent masa flavor.

EXAMPLE IV

A masa flavored canned sweet corn was formed having a good flavor combination and masa level by heating 198 grams canned sweet corn, 10 grams masa flavored corn flour produced in the manner described in Example I and 18.6 grams water.

EXAMPLE V

A slightly too pronounced masa flavored salsa sauce was formed by blending 360 grams of a salsa sauce with 10 grams of masa flavored corn flour produced in the manner described in Example I.

EXAMPLE VI

A masa flavored chili having a good flavor combination was formed by heating 360 grams canned chili, 19 grams masa flavored corn flour produced in the manner described in Example I and 30 grams water. The masa flavored corn flour concentration could be reduced from 4.7% by weight to 2% while having a noticeable masa flavored chili.

EXAMPLE VII

A masa flavored ground turkey was formed by mixing 168.8 grams ground turkey, 18.8 grams masa flavored corn flour produced in the manner described in Example I and 5.2 grams water.

I claim:

1. A food product comprising a major portion of an under or non-nixtamalized farinaceous component and a minor portion of a nixtamalized component having pronounced masa flavor.

2. The food product of claim 1, wherein the under or non-nixtamalized farinaceous component comprises wheat flour and the nixtamalized component having pronounced masa flavor comprises corn flour.

3. The food product of claim 1, wherein the weight ratio of nixtamalized corn flour to wheat flour ranges from 1:1 to 1:20.

4. A food product comprising a major portion of non-nixtamalized component substantially free of masa flavor and minor portion of a nixtamalized corn flour having pronounced masa flavor wherein the nixtamalized corn flour component is produced by heating a superficially dry composition comprising corn flour, alkaline compound in a concentration of at least 0.2 parts by weight per 100 parts by weight corn flour (d.s.b.) and water in a closed system to develop a pronounced masa flavor without pasting the starch component of the corn flour while maintaining the water content of the composition in the closed system at 2% to 20% by weight of the composition.

5. The food product of claim 4, wherein the weight ratio of nixtamalized corn flour to non-nixtamalized component ranges from 1:1 to 1:20.

6. The food product of claim 5, wherein the non-nixtamalized component comprises a farinaceous component.

7. The food product of claim 6, wherein the farinaceous component comprises wheat flour and the weight ratio of nixtamalized corn flour to wheat flour ranges from 1:2 to 1:10.

8. The food product of claim 5, wherein the corn flour comprises dry milled degermed corn.

9. The product of claim 5 wherein the superficially dry composition comprises 0.3 to 6 parts by weight fat per 100 parts by weight corn flour (d.s.b.).

10. The product of claim 9, wherein the superficially dry composition is heated to about 150° C. to 250° F.

* * * * *

UNITED STATES PATENT AND TRADEMARK OFFICE
CERTIFICATE OF CORRECTION

PATENT NO.     : 6,277,421 B1
DATED          : August 21, 2001
INVENTOR(S)    : Roger M. Burge It is certified that error appears in the above-identified patent and that said Letters Patent is hereby corrected as shown below:

Column 1,
Line 27, delete "are" and insert -- is --
Line 31, delete "can not" and insert -- cannot --.

Column 2,
Line 31, delete "content the" and insert -- content, the --
Lines 51 and 52, delete "C" and insert -- F --
Line 63, delete "nixtamaliz;ed" and insert -- nixtamalized --.

Column 3,
Line 35, delete "1" and insert -- I --
Line 55, delete "III" and insert -- II --.

Column 4,
Line 62, delete "C" and insert -- F --.

Signed and Sealed this

Twenty-fifth Day of June, 2002

*Attest:*

JAMES E. ROGAN
*Director of the United States Patent and Trademark Office*

*Attesting Officer*